US011768778B2

United States Patent
Moyer

(10) Patent No.: US 11,768,778 B2
(45) Date of Patent: Sep. 26, 2023

(54) RE-REFERENCE INDICATOR FOR RE-REFERENCE INTERVAL PREDICTION CACHE REPLACEMENT POLICY

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/490,820

(22) Filed: Sep. 30, 2021

(65) Prior Publication Data

US 2023/0096814 A1 Mar. 30, 2023

(51) Int. Cl.
*G06F 12/00* (2006.01)
*G06F 12/123* (2016.01)

(52) U.S. Cl.
CPC .... *G06F 12/123* (2013.01); *G06F 2212/1044* (2013.01)

(58) Field of Classification Search
CPC ...... G06F 12/12; G06F 12/121; G06F 12/122; G06F 12/123; G06F 12/124; G06F 12/125; G06F 12/126; G06F 12/127; G06F 12/128
See application file for complete search history.

(56) References Cited

U.S. PATENT DOCUMENTS

| | | | |
|---|---|---|---|
| 2001/0001873 A1* | 5/2001 | Wickeraad | G06F 12/121 711/E12.07 |
| 2007/0094450 A1 | 4/2007 | Vanderwiel | |
| 2014/0006717 A1 | 1/2014 | Steely, Jr. et al. | |
| 2017/0357588 A1* | 12/2017 | Moyer | G06F 12/128 |
| 2019/0018798 A1 | 1/2019 | Al Sheikh et al. | |
| 2020/0117607 A1 | 4/2020 | Thompto et al. | |
| 2020/0242049 A1* | 7/2020 | Loh | G06F 12/0808 |
| 2021/0089472 A1* | 3/2021 | Ishii | G06F 12/121 |
| 2021/0182213 A1 | 6/2021 | Yin et al. | |

OTHER PUBLICATIONS

"High Performance Cache replacement Using Re-Reference Interval Prediction(RRIP)", Jun. 2010 (Year: 2010).*
Jaleel, A., et. al., "High Performance Cache Replacement Using Re-Reference Interval Prediction (RRIP)", ISCA 10: Proceedings of the 37th Annual International Symposium on Computer Architecture, ACM, 12 pgs., Jun. 19, 2010.

* cited by examiner

*Primary Examiner* — Arvind Talukdar
(74) *Attorney, Agent, or Firm* — Volpe Koenig

(57) ABSTRACT

Techniques for performing cache operations are provided. The techniques include tracking re-references for cache lines of a cache, detecting that eviction is to occur, and selecting a cache line for eviction from the cache based on a re-reference indication.

18 Claims, 4 Drawing Sheets

RE-REFERENCE INDICATOR FOR RE-REFERENCE INTERVAL PREDICTION CACHE REPLACEMENT POLICY

BACKGROUND

Modern microprocessors implement a wide array of features for high throughput. Some such features include having highly advanced caches for high performance memory operations. Improvements to such features are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for performing cache operations are provided. The techniques include tracking re-references for cache lines of a cache, detecting that eviction is to occur, and selecting a cache line for eviction from the cache based on a re-reference indication.

Figure 1:
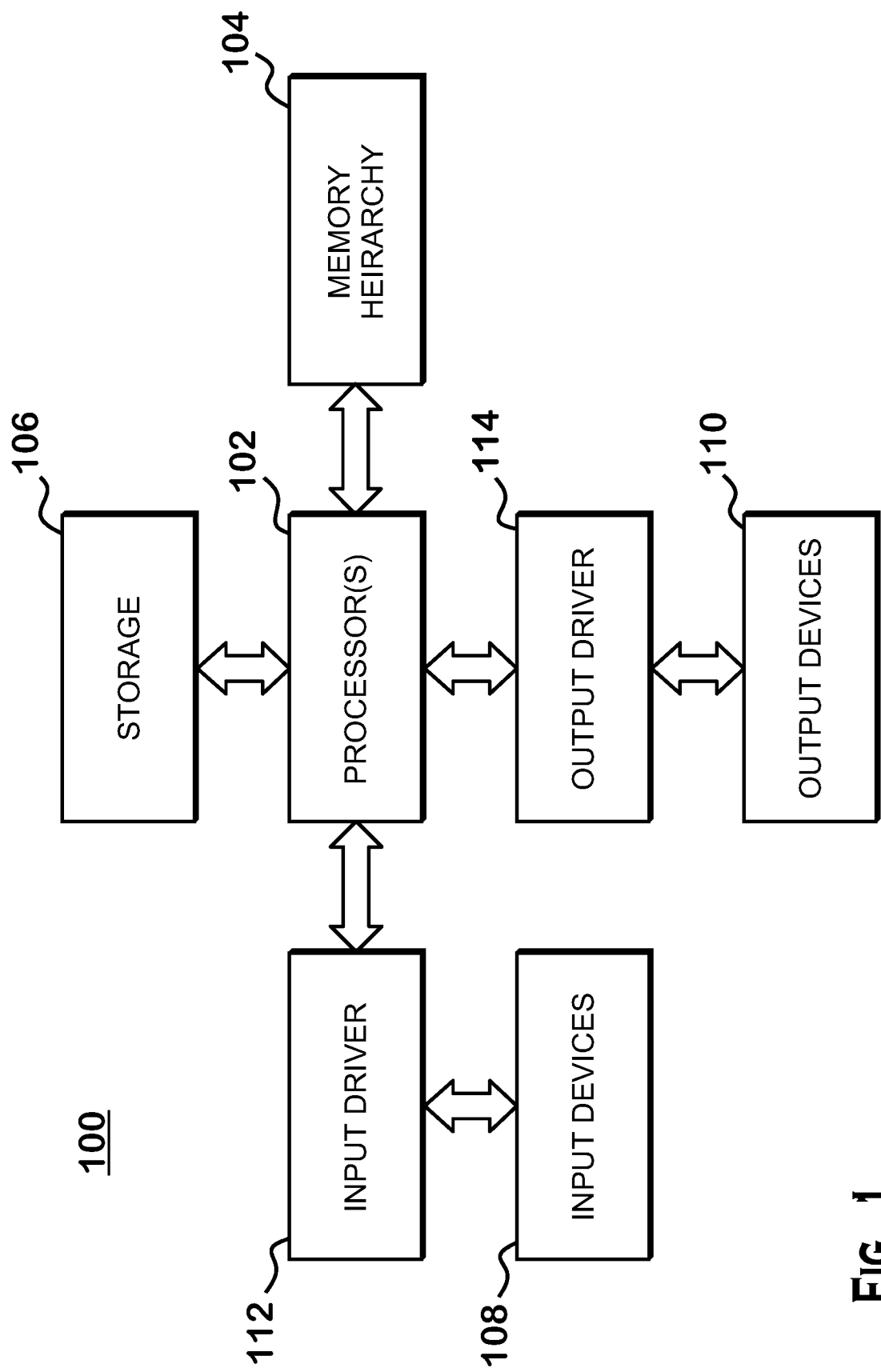
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types. In various examples, one or more of the caches of the memory hierarchy 104 include one or more associated cache controllers. In some examples, the elements of the memory hierarchy 104 are arranged in a hierarchy that includes the elements of the one or more processors 102.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
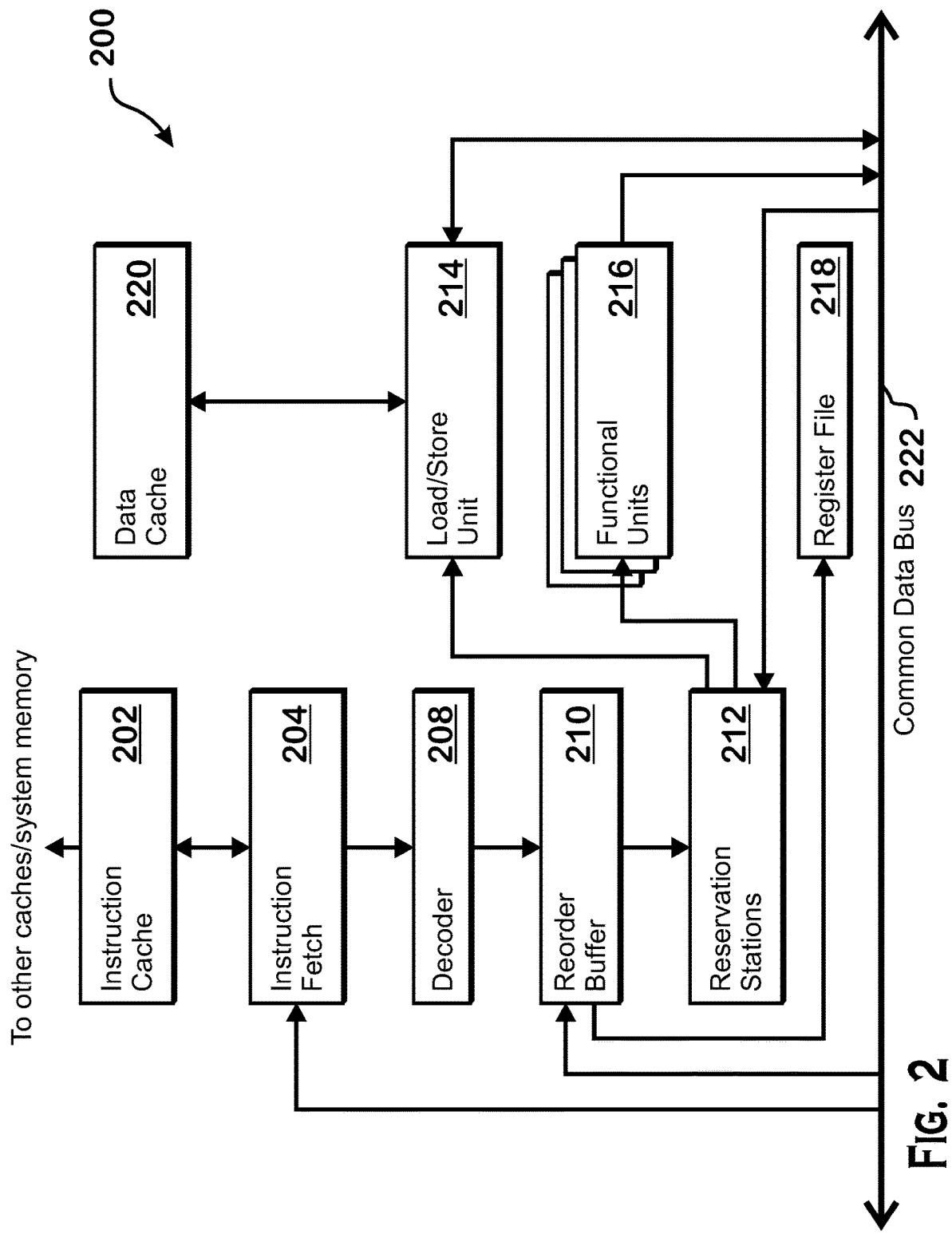
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

One or more of the various caches of the memory hierarchy 104 implement cache line replacement policies to determine which cache lines to evict when an eviction occurs. In some examples, an eviction occurs in the event that a cache line is to be stored in the cache and there are no slots available for the cache line. In some examples, such as with set associative caches, each cache line is permitted to be stored in a particular set (often identified by some combination of bits of the cache line address), each of which includes multiple "ways." A combination of set and way identifies a slot in a cache. If all cache lines in a particular set are in use (e.g., not invalid) when another cache line is to be stored in that set, then one of the cache lines is evicted. In some examples, a cache controller identifies a cache line to be evicted based on an eviction policy.

One example replacement policy is a re-reference interval prediction ("RRIP") replacement policy. This replacement policy attempts to track cache line re-references and to identify a cache line for eviction based on these re-references. A re-reference is an access to a cache line subsequent to the initial reference that causes the miss that brings the cache line into the cache.

In some examples, the RRIP replacement policy is implemented with a counter for each cache line. When a cache line is brought into the cache, the counter value is set to an initial value, which, in some examples, is a middle value between the minimum and maximum values possible for the counter. The value stored by the counter is sometimes referred to herein as the "re-reference count." Subsequently, when the cache line is referenced again (e.g., via a read or write, performed for an associated load or store instruction), the counter value is updated to indicate that the associated cache line was re-referenced "recently" (e.g., by resetting the value to 0).

When an eviction is to occur for a cache line that is to be stored in a set, if there is one counter that has a value considered to indicate that a cache line associated with the counter is predicted to be re-referenced in the sufficiently distant future, then the associated cache line is selected as the cache line to be evicted. If there is no cache line in the set whose associated counter indicates that the cache line is predicted to be re-referenced in the sufficiently distant future, then each counter is incremented until there is a counter that indicates that the associated cache line is predicted to be re-referenced in the sufficiently distant future. In some examples, this increment is a simple addition operation which adds to all counters the difference between the highest counter value and the value that is associated with a counter indicating that the associated cache line is predicted to be re-referenced in the sufficiently distant future. In some examples, the value indicating that a cache line is predicted to be re-referenced in the sufficiently distant future is some sufficiently high value. In some examples, the value is the maximum value that the counter is able to count to. In other examples, the value is a different value that is sometimes referred to herein as a threshold value or just a threshold.

In the above scheme, it is possible for multiple cache lines in a set to have associated counter values that are the same and are considered to indicate that the associated cache line is predicted to be re-referenced in the sufficiently distant future. In such case, it is possible to apply any technically feasible tiebreaker to determine which, of the cache lines having the value indicating the associated cache line is predicted to be reused in the sufficiently distant future, should be selected for eviction. It should be noted, however, that it is possible for such counters to arrive at such a value in two different ways. In one way, the cache line associated with the counter is never re-referenced after being brought into the cache and is simply "aged". In another way, the cache line is re-referenced one or more times and is subsequently "aged." Thus the counter for a cache line that is never re-referenced can have the same value as a counter that has been re-referenced. Thus there is ambiguity as to whether a counter value that indicates that a cache line is predicted to be re-referenced in the sufficiently distant future was actually reused or was never reused.

For this reason, techniques are provided herein for differentiating between cache lines that were re-referenced and cache lines that were not re-referenced. Specifically, when a cache line is brought into the cache, a re-reference indicator (which in some examples is one bit) is set to indicate that the cache line has not been re-referenced. When a cache line is re-referenced, the re-reference indicator is set to indicate that the cache line has been re-referenced.

In general, the cache uses the re-reference indicator in a tiebreaker role, to select one of the cache lines whose counter indicates the cache line is predicted to be re-referenced in the sufficiently distant future. A tiebreaker occurs where the counter for multiple cache lines have an equivalent value. In some examples, from two or more cache lines whose counters have equivalent values, the cache selects the cache line whose re-reference indicator indicates that the cache line has not been re-referenced, for eviction. In other examples, from two or more cache lines whose counters have equivalent values, the cache selects the cache line whose re-reference indicator indicates that the cache line has been re-referenced.

In some examples, the cache is capable of operating in at least two modes. In one mode, for a tiebreaker, the cache evicts cache lines that have not been re-referenced and in another mode, for a tiebreaker, the cache evicts cache lines that have been re-referenced. In some examples, the cache switches between these two modes. In some examples, this switch occurs according to an adaptive policy. In the adaptive policy, the cache maintains two test sets. In a first test set, the cache operates that test set such that, with a tiebreaker, the cache evicts cache lines that have not been re-referenced. In a second test set, the cache operates that test set such that, with a tiebreaker, the cache evicts cache lines that have been re-referenced. Based on a performance metric observed in the first test set and the second test set, the cache applies the tiebreaker associated with one of those test sets. Specifically, the cache selects the tiebreaker associated with the test set that "performs better." In some examples, performing better means exhibiting a lower number of misses. In some examples, performing better means that a performance metric for the test set is lower than the performance metric for the other test set. In some examples, the cache determines the performance metric by adding a value to the performance metric when a miss occurs, where the value is a weight value related to the performance impact of the miss. In some examples, the performance metric is how much performance suffers as a result of the miss. Performance suffering can be measured in any technically feasible manner, such as performance resulting in a lower instruction per clock cycle count, or any other technically feasible manner.

Figure 3A:
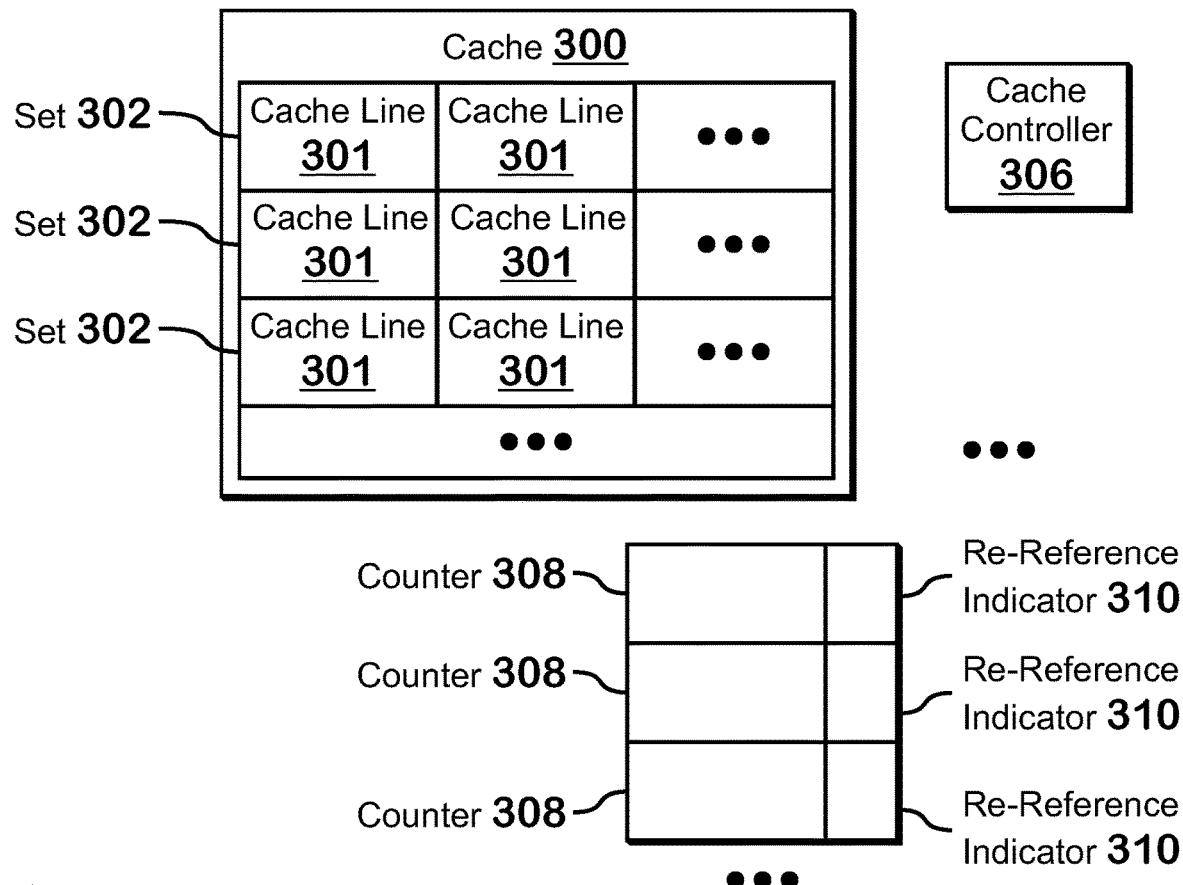
FIG. 3A is a block diagram of a cache, according to an example.

FIG. 3A illustrates a cache 300 that implements a re-reference interval prediction technique with re-reference indicator, according to an example. In some examples, the cache 300 is one of the caches of the memory hierarchy 104 of FIG. 1, and in other examples, the cache 300 is used in any technically feasible context, such as for memories other than cache memories.

The cache 300 includes a plurality of sets 302. A cache controller 306 controls operations of the sets 302 of the cache 300. The sets 302 include multiple cache lines 301. The cache controller 306 maintains, for a plurality of cache lines 301 in the sets, re-reference interval counters 308 and re-reference indicators 310. The re-reference interval counters 308 store, for an associated cache line 301, a re-reference interval prediction. This prediction indicates how long in the future the cache line 301 is predicted to be re-referenced. Each cache line 301 also has an associated re-reference indicator 310 that indicates, for the associated cache line 301, whether that cache line 301 has been re-referenced (i.e., referenced again, after being brought into the cache in response to a first reference).

After bringing a cache line 301 into the cache 300 (e.g., as the result of a miss), the cache controller 306 sets the value of the counter 308 for that cache line 301 to a default value (in some examples, 0) and sets the re-reference indictor 310 to indicate that the cache line 301 has not been re-referenced. When a cache line 301 in the cache 300 is referenced, the cache controller 306 sets the value of the corresponding counter 308 to zero and the re-reference indicator 310 to indicate that the cache line 301 has been re-referenced.

The cache controller 306 services eviction requests for a particular set 302 by examining the counters 308 for each cache line 301 of the request. The cache controller 306 selects the cache line 301 for eviction having an associated counter 308 that indicates that the cache line 301 is predicted to be re-referenced "in the sufficiently distant future." In some examples, the value of such a counter is the maximum possible value for that counter. If no such counter 308 exists, then the cache controller 306 increments all counters 308 for the set 302 until at least one counter 308 has a value that indicates that the associated cache line 301 is predicted to be re-referenced in the sufficiently distant future.

In the event that multiple cache lines 301 have counters 308 that indicate that the associated cache line 301 is predicted to be re-referenced in the sufficiently distant future, the cache controller 306 selects a cache line 301 for eviction using a tiebreaking mechanism. The tiebreaking mechanism is based on the value of the re-reference indicator 310. In some modes of operation, where two or more cache lines 301 are is predicted to be re-referenced in the sufficiently distant future, the cache controller 306 selects the cache line 301 that has not been re-referenced for eviction. In other modes of operation, where two or more cache lines 301 are predicted to be re-referenced in the sufficiently distant future, the cache controller selects the cache line 301 that has been re-referenced for eviction. In some examples, the cache controller 306 switches between these modes. In some examples, this switching is based on a testing mechanism in which some cache sets 302 are designated as test sets and these test sets test the performance of a mode in which cache lines 301 that have not been re-referenced are evicted in the event of a tie and a mode in which the cache lines 301 that have been re-reference are evicted in the event of a tie.

Figure 3B:
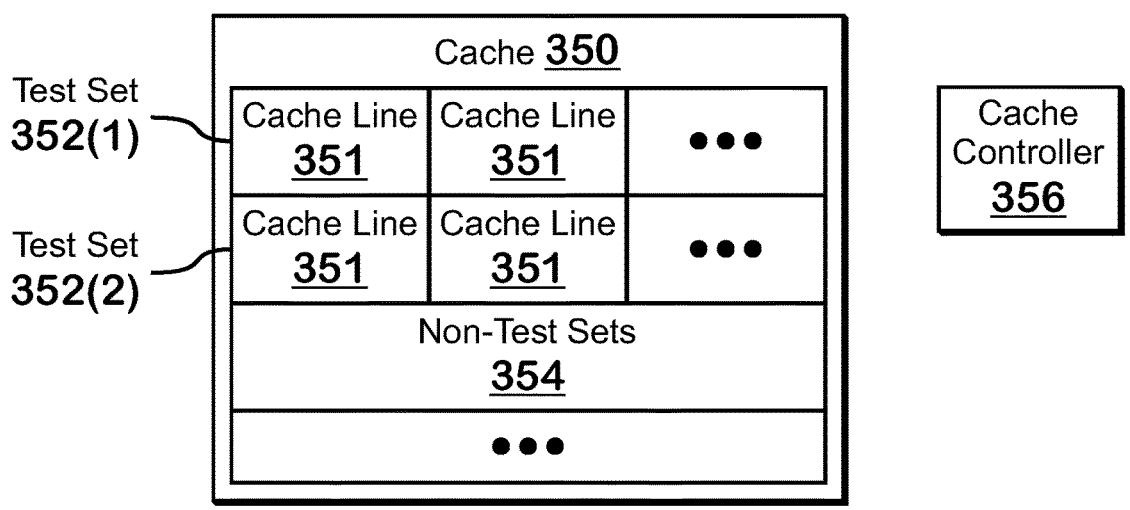
FIG. 3B is a block diagram of a cache, according to another example.

FIG. 3B is a block diagram that illustrates a cache with test sets and non-test sets. The cache controller 356 is similar to the cache controller 306 of FIG. 3A. The cache 350 is similar to the cache 300 of FIG. 3A. The cache 350 includes test sets 352 and non-test sets 354. The cache controller operates the test set 352(1) in a manner in which cache lines 351 that have not been re-referenced are evicted in the event of a tie and the cache controller operates the test set 352(2) in a mode in which the cache lines 351 that have been re-referenced are evicted in the event of a tie. The cache controller 356 observes the operational results of these test sets 352 and operates the non-test sets 354 according to which scheme performs better. In some examples, performing better means that fewer misses are observed, but any measure of performance may be used. In some examples, performing better means better instructions per cycle are observed for software using a particular test set 352 than for software using a different test set 352. In an example, if the cache controller 356 observes that test set 352(1) performs better, then the cache controller operates the non-test sets 354 according to the manner in which the test set 352(1) is operated and if the cache controller 356 observes that the test set 352(2) performs better, then the cache controller 356 operates the non-test sets 354 according to the manner in which the test set 352(2) is operated.

Figure 4:
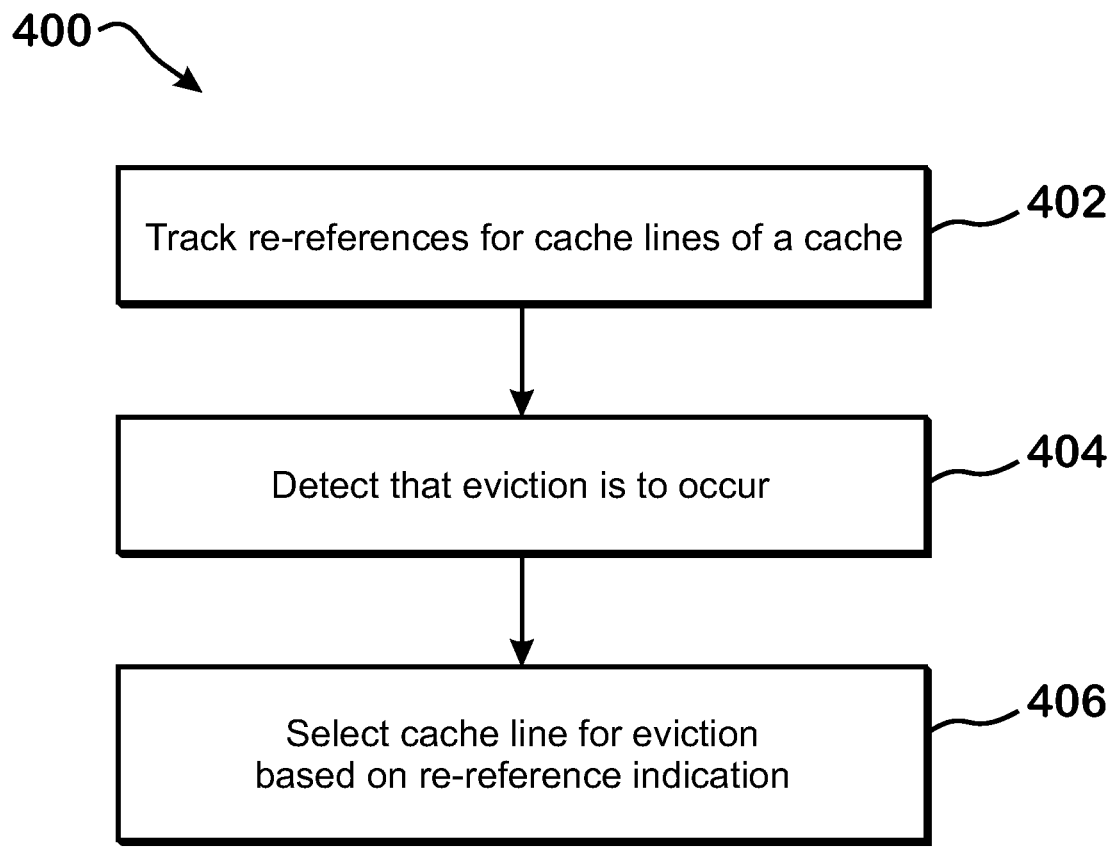
FIG. 4 is a flow diagram of a method for performing cache operations, according to an example.

FIG. 4 is a flow diagram of a method 400 for performing cache replacement operations, according to an example. Although described with respect to the system of FIGS. 1-3B, those of skill in the art will understand that any system configured to perform the steps of the method 400 in any technically feasible order falls within the scope of the present disclosure.

At step 402, a cache controller 306 tracks re-references for cache lines of a cache 300. A re-reference to a cache line includes an access to the cache line after the access that brings the cache line into the cache (e.g., due to a miss). In an example, a memory access occurs for a particular memory address, and the cache line including that memory address is not stored in the cache. Thus, a miss occurs, and the cache controller 306 services the miss by fetching the cache line from another source such as another cache.

In some examples, tracking the re-references for a cache line includes the following. When a cache line is first brought into the cache, the cache controller 306 sets a re-reference counter 308 to a default value and sets a re-reference indicator to include an indication that the cache line has not been re-referenced. In some examples, the default value is an intermediate value between the minimum and maximum value. In some examples, the default value is an average between the minimum and maximum values.

In some examples, the tracking also includes, in response to a re-reference of a cache line, setting the value of the re-reference counter to a value of zero and setting the re-reference indicator to indicate that the cache line has been referenced. In some examples, the tracking also includes, in response to a cache line needing to be evicted, identifying whether a re-reference counter indicates that a cache line is predicted to be re-referenced in the sufficiently distant future. In some examples, a re-reference counter makes this indication in the event that the re-reference counter has its maximum value. In other examples, a re-reference counter makes this indication in the event that the re-reference counter has at least a threshold value. If no counter has such an indication, then the cache controller 306 increments all counters for the set from which the eviction is occurring (i.e., the set that the cache line being brought in is to be stored in) by an equivalent value such that at least one such re-reference counter 308 indicates that a cache line is predicted to be re-referenced in the sufficiently distant future.

At step 404, the cache controller 306, detects that eviction is to occur. In some examples, an eviction occurs where a cache line is to be brought into a set 302 (e.g., due to a miss), and there are no free slots in the set 302. In this instance, the cache controller 306 needs to select a cache line 301 for eviction.

At step 406, the cache controller 306 selects a cache line for eviction based on a re-reference indication. More specifically, in the event that at least two cache lines, in the set 302 from which cache lines are to be evicted, have an indication that the cache line is predicted to be re-referenced in the sufficiently distant future, the cache controller 306 performs a tiebreaker, selecting one of those cache lines 301 for eviction. In some examples, the tiebreaker is dependent on the value of the re-reference indicator 310. In some modes of operation or some implementations, the cache controller 306 selects, as a tiebreaker, the cache line 301 whose re-reference indicator 310 indicates that the cache line 301 has not been re-referenced. In some modes of operation or some implementations, the cache controller 306 selects, as a tiebreaker, the cache line 301 whose re-reference indicator 310 indicates that the cache line 301 has been re-referenced. In some examples, the cache controller 306 implements a testing mechanism to test which of the above two modes is more beneficial. More specifically, the cache controller 306 designates one or more sets 302 to test the mode in which cache lines 301 indicated as being not re-referenced are selected for eviction and one or more other sets 302 to test the mode in which cache lines 301 indicated as being re-referenced are selected for eviction. The cache controller operates the remaining sets 302 with the mode that performs better. While any performance metric may be used, in some examples, number of misses, or weighted number of misses is used. With number of misses, the cache controller 306 selects the mode that operates with fewer misses to operate the cache 300. With weighted number of misses, the cache controller 306 accumulates, into a performance metric value, with each miss that occurs, a weight indicating how "impactful" that miss is. The cache controller 306 operates the cache 300 with the performance metric value that is the lowest.

It should be understood that many variations are possible based on the disclosure herein. Although features and elements are described above in particular combinations, each feature or element may be used alone without the other features and elements or in various combinations with or without other features and elements.

The various elements illustrated in the Figures are implementable as hardware (e.g., circuitry), software executing on a processor, or a combination of hardware and software. In various examples, each block, such as the illustrated units of the instruction execution pipeline 200 and the computer system 100, and the cache 300, sets 302, cache lines 301, cache controller 306, counters 308, and re-reference indicators 310 are implementable as hardware (e.g., a hardware processor and/or a circuit), software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   tracking re-references for cache lines of a cache to update re-reference counts and re-reference indications for the cache lines;
   detecting that eviction is to occur; and
   in response to a first re-reference count for a first cache line of the cache lines being equal to a second re-reference count of a second cache line of the cache lines, selecting either the first cache line or the second cache line for eviction based on the re-reference indications.

2. The method of claim 1, wherein tracking the re-references includes:
   responsive to the first cache line being first brought into the cache, setting the first re-reference count for the first cache line to a default value and setting a first re-reference indicator for the first cache line, of the re-reference indicators, to include an indication that the first cache line has not been re-referenced; and
   responsive to the second cache line being first brought into the cache, setting the second re-reference count for the second cache line to a default value and setting a second re-reference indicator for the second cache line, of the re-reference indicators, to include an indication that the second cache line has not been re-referenced.

3. The method of claim 2, wherein the default value is an intermediate value between a minimum re-reference counter value and a maximum re-reference counter value.

4. The method of claim 1, wherein tracking the re-references includes:
   for a cache line in the cache having an indication that the cache line has not been re-referenced, detecting an access to the cache line; and
   responsive to detecting the access, setting an indication that the cache line has been re-referenced.

5. The method of claim 1, wherein selecting either the first cache line or the second cache line for eviction based on the re-reference indications includes:
   determining that the re-reference indication for the first cache line indicates that the first cache line has been re-referenced and that the re-reference indication for the second cache line indicates that the second cache line has not been re-referenced; and in response to the determining, selecting the first cache line for eviction.

6. The method of claim 1, wherein selecting either the first cache line or the second cache line for eviction based on the re-reference indication includes:

determining that the re-reference indication for the first cache line indicates that the first cache line has been re-referenced and that the re-reference indication for the second cache line indicates that the second cache line has not been re-referenced; and in response to the determining, selecting the second cache line for eviction.

7. The method of claim 1, wherein tracking the re-references includes:

in response to determining that an eviction is to occur to store a cache line into a set of the cache, detecting that no cache line of the set has a re-reference count that includes an indication that a corresponding cache line is predicted to be re-referenced in the sufficiently distant future; and in response, incrementing each count for the cache lines of the set such that at least one cache line of the set includes a re-reference count that includes an indication that the at least one cache line is predicted to be re-referenced in the sufficiently distant future.

8. The method of claim 1, further comprising:

selecting an operating scheme for the cache lines of the cache based on testing performed for a plurality of test sets.

9. A system, comprising:

a cache configured to store cache lines; and a cache controller communicatively coupled to the cache and configured to:

track re-references for the cache lines to update re-reference counts and re-reference indications for the cache lines;

detect that eviction is to occur; and in response to a first re-reference count for a first cache line of the cache lines being equal to a second re-reference count of a second cache line of the cache lines, select either the first cache line or the second cache line for eviction based on the re-reference indications.

10. The system of claim 9, wherein tracking the re-references includes:

responsive to the first cache line being first brought into the cache, setting the first re-reference count for the first cache line to a default value and setting a re-reference indicator for the first cache line, of the re-reference indicators to include an indication that the first cache line has not been re-referenced; and responsive to the second cache line being first brought into the cache, setting the second re-reference count for the second cache line to a default value and setting a second re-reference indicator for the second cache line, of the re-reference indicators, to include an indication that the second cache line has not been re-referenced.

11. The system of claim 10, wherein the default value is an intermediate value between a minimum re-reference counter value and a maximum re-reference counter value.

12. The system of claim 9, wherein tracking the re-references includes:

for a cache line in the cache having an indication that the cache line has not been re-referenced, detecting an access to the cache line; and responsive to detecting the access, setting an indication that the cache line has been re-referenced.

13. The system of claim 9, wherein selecting either the first cache line or the second cache line for eviction based on the re-reference indication includes:

determining that the re-reference indication for the first cache line indicates that the first cache line has been re-referenced and that the re-reference indication for the second cache line indicates that the second cache line has not been re-referenced; and in response to the determining, selecting the first cache line for eviction.

14. The system of claim 9, wherein selecting either the first cache line or the second cache line for eviction based on the re-reference indication includes:

determining that the re-reference indication for the first cache line indicates that the first cache line has been re-referenced and that the re-reference indication for the second cache line indicates that the second cache line has not been re-referenced; and in response to the determining, selecting the second cache line for eviction.

15. The system of claim 9, wherein tracking the re-references includes:

in response to determining that an eviction is to occur to store a cache line into a set of the cache, detecting that no cache line of the set has a re-reference count that includes an indication that a corresponding cache line is predicted to be re-referenced in the sufficiently distant future; and in response, incrementing each count for the cache lines of the set such that at least one cache line of the set includes a re-reference count that includes an indication that the at least one cache line is predicted to be re-referenced in the sufficiently distant future.

16. The system of claim 9, wherein the cache controller is further configured to:

select an operating scheme for the cache lines of the cache based on testing performed for a plurality of test sets.

17. The method of claim 1, wherein the re-reference counts are related to how many times the cache lines have been accessed after entering the cache, and the re-reference indications each indicating whether a corresponding cache line has or has not been accessed since entering the cache.

18. The system of claim 9, wherein the re-reference counts are related to how many times the cache lines have been accessed after entering the cache, and the re-reference indications each indicating whether a corresponding cache line has or has not been accessed since entering the cache.

* * * * *